(12) United States Patent
Trüb et al.

(10) Patent No.: US 8,722,766 B2
(45) Date of Patent: May 13, 2014

(54) METHOD FOR THE SOLVENT-FREE PRODUCTION OF THERMOPLASTIC DISPERSIONS

(75) Inventors: Peter Trüb, Ramsen (CH); Dominic Ph. Trüb, Stein am Rhein (CH)

(73) Assignee: Trub Emulsions Chemie AG, Ramsen (CH)

( * ) Notice: Subject to any disclaimer, the term of this patent is extended or adjusted under 35 U.S.C. 154(b) by 256 days.

(21) Appl. No.: 13/003,836

(22) PCT Filed: Jul. 6, 2009

(86) PCT No.: PCT/EP2009/058471
§ 371 (c)(1),
(2), (4) Date: Mar. 11, 2011

(87) PCT Pub. No.: WO2010/006941
PCT Pub. Date: Jan. 21, 2010

(65) Prior Publication Data
US 2011/0269895 A1     Nov. 3, 2011

(30) Foreign Application Priority Data
Jul. 16, 2008   (EP) .................................... 08160557

(51) Int. Cl.
*C08J 3/00* (2006.01)

(52) U.S. Cl.
USPC ............ 523/344; 422/225; 422/236; 422/308

(58) Field of Classification Search
USPC ........................... 523/344; 422/225, 236, 308
See application file for complete search history.

(56) References Cited

U.S. PATENT DOCUMENTS

| | | |
|---|---|---|
| 4,125,574 A | 11/1978 | Kastner et al. |
| 4,693,909 A | 9/1987 | Ziegler et al. |
| 5,206,279 A | 4/1993 | Rowland et al. |
| 5,387,635 A | 2/1995 | Rowland et al. |
| 5,397,635 A | 3/1995 | Wood, Jr. |
| 6,852,792 B1 | 2/2005 | Capendale et al. |
| 2004/0029977 A1 | 2/2004 | Kawa et al. |
| 2007/0227401 A1 | 10/2007 | Ganschow et al. |

FOREIGN PATENT DOCUMENTS

| | | |
|---|---|---|
| CA | 2 602 039 A1 | 10/2006 |
| CN | 101 098 939 A | 1/2008 |
| CN | 101 193 952 A | 6/2008 |
| EP | 0 173 456 A2 | 3/1986 |
| EP | 0 359 045 A2 | 3/1990 |
| JP | H05-505-644 A | 8/1993 |
| JP | 2002-220498 A | 8/2002 |
| WO | 92/13012 | 8/1992 |
| WO | 98/06774 A1 | 2/1998 |
| WO | 2005/021638 A2 | 3/2005 |
| WO | 2006/105942 A1 | 10/2006 |
| WO | 2007/110417 A1 | 10/2007 |

*Primary Examiner* — Edward Cain
(74) *Attorney, Agent, or Firm* — Sughrue Mion, PLLC

(57) ABSTRACT

Disclosed is a method for the production of thermoplastic polymer dispersions, using a reaction vessel with a first volume and a secondary volume, wherein a first stirrer is located and operative in said first volume and a secondary stirrer is located and operative in said secondary volume, wherein the first volume is at least 20 times larger than the secondary volume, wherein the stirrers in both volumes are able to handle viscosities above of or equal to 1000 mpas, including the steps of a.) loading the first volume of the vessel with an initial amount of polymer and optionally water and optionally alkaline; b.) heating the vessel externally to a target process temperature in the range of 80-300° C.; c.) operating the first stirrer in the first volume for at least half an hour at a speed of in the range of 10-100 rpm; d.) addition of water and optionally alkaline to the first volume; e.) connection of the secondary volume to the first volume and operating the secondary stirrer in the secondary volume at a speed of above 1000 rpm and recycling the reaction product through said secondary stirrer while keeping the operating temperature essentially constant during a timespan in excess of the recycle ratio3 of the primary and the secondary mixer to form the dispersion. Furthermore disclosed is a dispersion as obtainable using such a method and a reaction vessel for carrying out such a method.

23 Claims, 1 Drawing Sheet

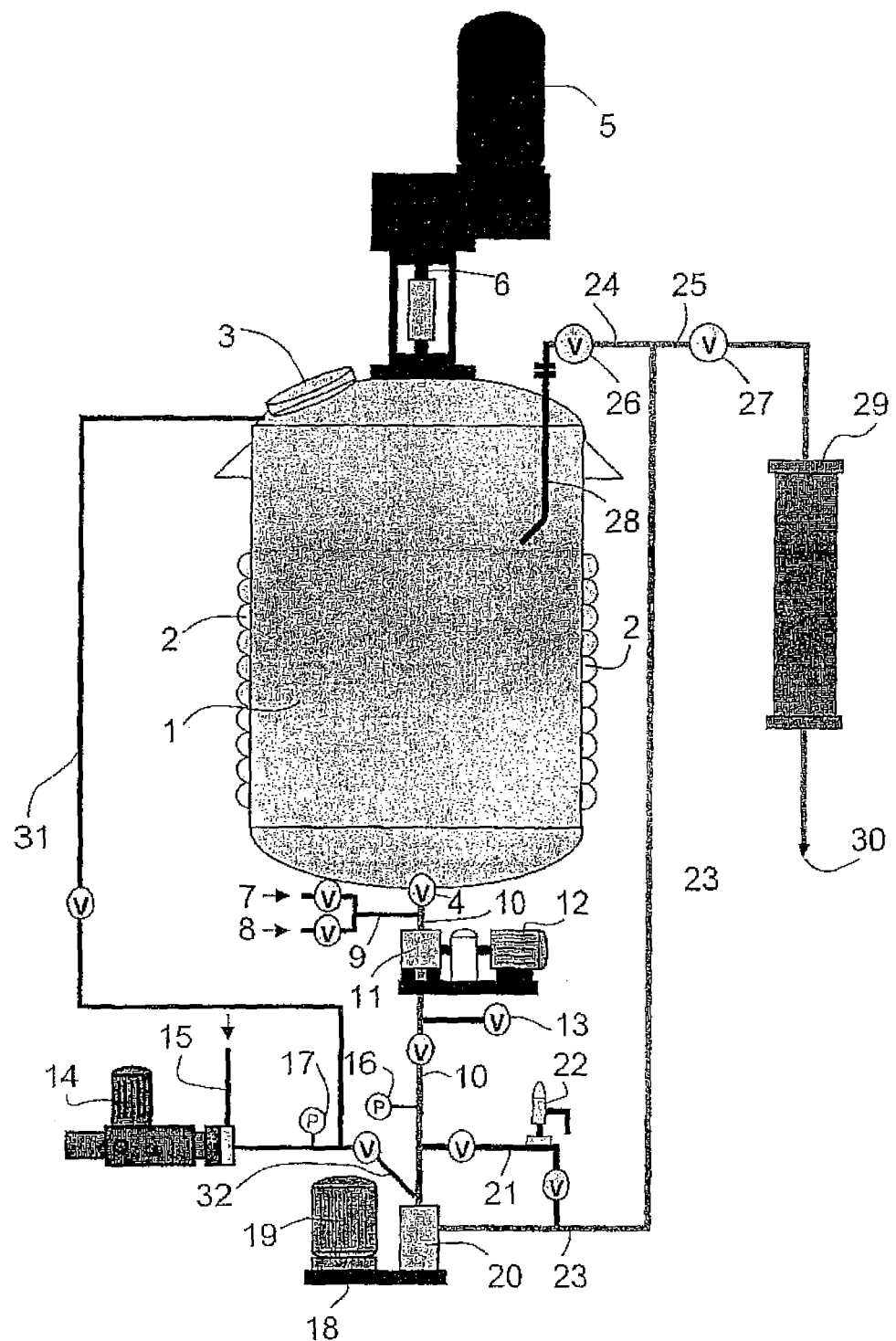

METHOD FOR THE SOLVENT-FREE PRODUCTION OF THERMOPLASTIC DISPERSIONS

CROSS REFERENCE TO RELATED APPLICATIONS

This application is a National Stage of International Application No. PCT/EP2009/058471 filed on Jul. 6, 2009, which claims priority from European Patent Application No. 08160557.8, filed on Jul. 16, 2008, the contents of all of which are incorporated herein by reference in their entirety.

TECHNICAL FIELD

The present invention relates to the field of processes for making thermoplastic elastomeric polymer dispersions.

BACKGROUND OF THE INVENTION

From the field of conservation agents for metal and coated surfaces for example it has been known for a long time to prepare aqueous dispersions in a process free from solvent, so only using water. For example U.S. Pat. No. 4,693,909 discloses a liquid preservative for plated or unplated metal surfaces and surfaces of coatings, in the form of an aqueous wax dispersion which contains a special ethylene/acrylic acid copolymer wax, consisting of from 8 to 25% by weight of acrylic acid units and from 92 to 75% by weight of ethylene units, in partially or completely neutralized form, if appropriate as a mixture with waxes based on polyethylene oxidation products and/or hydrocarbon waxes, the use of this special ethylene/acrylic acid copolymer wax for preserving plated or unplated metal surfaces and surfaces of coatings, and a process for temporarily preserving metal surfaces and surfaces of coatings. The dispersion is produced in that an ethylene/acrylic acid copolymer wax (referred to as EAA wax) as a starting material, frequently in the form of granules, is emulsified with the required amount of water and the appropriate amount of a base in an emulsification autoclave under from 4 to 6 bar and at from 140° C. to 160° C., while stirring.

More specific processes of this kind which are allegedly more efficient or lead to small size particle stable dispersions or which are based on different starting materials are disclosed in a number of documents such as for example U.S. Pat. Nos. 5,387,635, 5,206,279, WO 98/06774, or US 2004/0029977. WO2007/110417 specifically discloses a process for the preparation of an aqueous rubber emulsion (artificial latex), comprising the steps: (a) size reduction of the rubber, whereby granules are produced with shorter dissolving time; (b) cement formation, wherein the granules of step (a) are dissolved in a suitable hydrocarbon solvent; (c) preparation of an aqueous soap solution; (d) emulsification of the cement formed in step (b), using the aqueous soap solution prepared in step (c), thus forming an oil in water emulsion; (e) hydrocarbon solvent removal, resulting in an aqueous emulsion of the rubber, and optionally (f) emulsion concentration, forming an artificial latex with a higher solids content, wherein in step (a) the size reduction is carried out using a to chopper and/or granulator characterized in that a soap is used as processing aid, preferably identical to the soap used in steps (c) and (d).

As concerns the practical realisation for carrying out such a process, EP 173 456 proposes a process in which a hydrophobic thermoplastic resin such as an olefin resin and a water-insoluble or non-water-swelling polymer containing a carboxylic acid salt group are melt-kneaded in the presence of water and phase inversion occurs to form a dispersion comprising resin particles dispersed in water, even if the amount of water is very small. If an anionic surfactant, optionally together with a solvent or oil, is included, the size of the dispersed resin particles can be greatly reduced even if a resin having a very high molecular weight or a high melt viscosity is used. In this document it is proposed to carry out the process either using a kneader, a Banbury mixer or a multi-shaft screw extruder.

Similar continuous methods using extruders are disclosed in EP 359045, DE 10109992, as well as WO 2005/021638.

SUMMARY OF THE INVENTION

The object of the present invention is therefore to provide an improved method for the production of thermoplastic or elastomeric polymer dispersions, preferably in a solvent-free manner.

The method is characterised in that it is using a reaction vessel with a first volume and a secondary volume, wherein a first stirrer is located and operative in said first volume and a secondary stirrer is located and operative in said secondary volume, wherein the first volume is at least 20 , times larger than the secondary volume, preferably 40 times larger or even 50 or 100 times larger, and wherein the stirrers in both volumes are able to handle viscosities above of or equal to 1000 meas. The method in particular includes the following steps:
a. loading the first volume of the vessel with an initial amount of polymer and optionally water and optionally alkaline;
b. heating the vessel externally to a target process temperature in the range of 80-300° C. (essentially to a temperature sufficient to melt the polymer);
c. operating the first stirrer in the first volume for at least half an hour at a speed of in the range of 10- 100 rpm (typically this step c. takes place at the same time as step b.);
d. addition of water and optionally alkaline to the first volume (unless enough water and optionally alkaline has already been added in step a.);
e. connection of the secondary volume to the first volume and operating the secondary stirrer in the secondary volume at a speed of above 1000 rpm and recycling the reaction product through said secondary stirrer while keeping the operating temperature essentially constant during a time span in excess of the recycle ratio 3 of the primary and the secondary mixer to form the dispersion (normally during this step the first stirrer in the first volume is also operating).

The recycle ratio is defined as the turnover factor of the reaction fluid in the first volume through the second volume. A recycle ratio of 3 , means that, statistically, the volume of the reaction fluid has circulated through the secondary volume three times, or in other words that the accumulated volume flow through the secondary volume is 3 times as much as the volume of the reaction fluid in the primary volume. Preferably the recycle ratio is larger than 5 and typically it is in the range of 3-10.

The method very efficiently allows to produce thermoplastic or elastomer polymer dispersions with an average particle size (meridian) below 20 µm, preferably below 10 µm, most preferably below or equal to 5 µm. Typically the meridian is in the range of 2-5 µm or 99% of the particles are smaller than 10 µm. Furthermore the particle size distributions a very narrow, typically they are characterised in that 90% of the particles are located within the range of 2-9 µm. Furthermore the method allows to very efficiently produce such thermoplastic elastomeric polymer dispersions with a pH value below 9, preferably below of or at 8.5, preferably in the range of 7-8.3, which are highly storage stable (more than three months) and which have a high solids content (in the range of 25-40% or even above that).

According to a preferred embodiment of the proposed method, within step a. the first volume is only loaded with polymer or polymer precursor, so no water is added but just the polymer typically in granular form. Then within step b. the first volume and the polymer in granular form therein is actively heated to a process temperature in the range of above or equal to 155° C., typically to a process temperature in the range of 155-180° C. This for most of the thermoplastic or elastomer polymer starting materials of interest leads to the melting of the starting material. Concomitant to the heating within step b. also process step c. takes place, so heating takes place under concomitant stirring action of the first stirrer in the first volume.

Preferably now the subsequent step d. comprises several sub steps as follows:

In a first step d1. a first amount of water, in combination with alkaline (typically preheated to a temperature of 120° C. at least) is added, normally this is done with a 10% or 10-40% KOH solution (or alternatively NaOH, amines, such as Diethylethanolamine (DEMA)) at the corresponding pH value and an amount is added leading to a solids content of approximately 90%. This first part of continuous and slow addition of water and alkaline as specified above of d. is usually carried out for a time span in the range of 15-60 minutes, preferably in the range of 30 minutes. Also a more rapid addition of water and alkaline is possible, so e.g. within 2-5 min. During all this time a temperature in the first volume of at least 140° C. is maintained. During this first part of step d. highly alkaline conditions with essentially just the minimum amount of water are maintained for an efficient reaction of the polymer.

After that, so when the addition of water with alkaline is sufficient and is stopped, typically the corresponding reaction mixture is stirred for another 10-30 minutes while preferably keeping the temperature essentially constant.

In a second step d2., which usually takes about 60-120 minutes, and during which the temperature is again preferably controlled to be essentially constant and at a level of at least 140° C., water is added (can be non-alkaline, but also alkaline possible with pH values in the range of 8-11; also preheated to a temperature of approximately 120° C.) slowly, and an amount is added leading to a solids content in the range of 50-70%.

This second step d2. aims at a preparation of the dispersion for the subsequent stirring in the secondary volume, for which typically stirring elements are used which cannot cope with solids contents above 70%.

According to a further preferred embodiment of the proposed process after the above-mentioned steps a.-e. a further amount of preheated water (non-alkaline) is added to the first volume and/or to the secondary volume in order to establish a solids content in the range of 30-50%.

Subsequently the reaction mixture is stirred for another 5-30 minutes, preferably for around five minutes, and then the recirculation line is diverted to an output line. In this output line the reaction mixture, which during the recirculation is typically at a temperature in the range of 140-168° C., is quickly cooled (plate cooler or or stirring cooler, typically 80-150 kg/min) to a temperature of 20-40 ° C. , normally in the range of 30° C. in a shock cooling step. This allows to establish a stable dispersion with a narrow particle size distribution and a high solids content. Essentially the viscosity of the target dispersion is in the range of 500-1500 mPas at a solids content of 25-50%.

As starting materials (thermoplastic/elastomeric polymer) systems such as EAA (ethylene acrylic acid), EMAA (ethylene/methacrylic acid), olein, stearin, rosins such as colophony, or mixtures thereof can be used. These systems can be used either alone or according to a further preferred embodiment as combined systems in combination with systems which taken alone essentially cannot be dispersed in water selected from: styrene (block) copolymers such as SIS (styrene-isoprene-styrene), SBS (styrene butadiene styrene), SEBS (styrene ethylene butadiene styrene), SES (styrene ethylene styrene), EVA (ethylene vinyl acetate), PP (polypropylene), PE (polyethylene), polyester, PET (polyethylene terephthalate), PVC (polyvinyl chloride). Any of these systems can be optionally grafted. If combinations with any of these systems or a mixture of these systems are to be dispersed, the above-mentioned thermoplastic/elastomeric polymer part, acting essentially like a dispersion aid or vehicle, and which actually reacts, has to be present as at least 20 volume percent, preferably in the range of 30-40 volume percent.

Typically, the target process temperature is in the range of 100-200° C.

Preferably, the secondary stirrer is a rotor stator pump, it can however also be of a different type as long as it matches the above criteria of high-speed stirring for efficient formation of the dispersion.

Typically, the tip speed of the primary stirrer, which must be able to withstand the very high viscosities of the initial thermoplastic polymer (typically initially in granular form) is below 50 km/h.

According to a first preferred embodiment, the first volume is located in a bottom part of the reaction vessel and the secondary volume is located in a top part of the reaction vessel, and when loading the reaction vessel initially only the bottom part forming the first volume is filled with reactants, wherein preferably the first and secondary stirrers are mounted in the reaction vessel coaxially.

According to a second preferred embodiment, the secondary stirrer is a rotor stator pump the input side of which is connected to the bottom of the first volume via a controllable valve, and the output side of which is connected to the top part of the first volume, and after step d. said valve is opened to initiate assisted recirculation during step e.

Typically, step c. is carried out for at least one hour, preferably for at least 3 hours, most preferably within 1-5 hours. Typically the two steps b. and c. are overlapping in the sense that the heating of step b. takes place under concomitant stirring according to step c., and the stirring continues after the actual heating to the target temperature has finished and is continued for a time span as indicated above. Switching from step c. to step d. normally takes place as soon as the reaction mixture is an essentially stable dispersion with a particle size in the range of 100-500 μm which can typically be recognized by a white or honey like colour without phase separation.

Normally, step e. is carried out for at least 5 minutes, preferably for at least 30 minutes, most preferably for at least an hour.

In order to make sure that the water is liquid during the dispersion formation process, during steps c.-e. the pressure in the reaction vessel, in particular in the first volume, is maintained in the range of 4-20 bar.

Normally after step e. the system is cooled down to room temperature and the dispersion can subsequently be diluted to the desired concentrations.

The present invention furthermore pertains to the dispersion as obtainable or obtained using a method as described above.

The present invention furthermore relates to a reaction vessel for carrying out a method as given above. Such a vessel comprises a first volume with external heating located in a bottom part and a secondary volume located in a top part. The first volume is at least 20 times, preferably at least 40 times, larger than the secondary volume, the stirrers in both volumes are able to handle viscosities above of or equal to 1000 mpas, a first stirrer is located in the first volume and a secondary stirrer is located in the secondary volume and the first and the secondary stirrers are mounted coaxially in the reaction vessel and can be operated at different speeds.

Also possible is a reaction vessel realising the above recycling of the reactants with a recycling or circulation pipe system.

Further embodiments of the present invention are outlined in the dependent claims.

To summarise, the present disclosure pertains to a process for the production of polymer dispersions with a final solids content of 25-65 wt. % in which process at least one polymer and water are mixed in a batch stirred tank. The process is in particular characterised in that the speed of a so-called primary stirrer is in the range of 100 rpm (tip speed 50 kmh) or less and the speed of a so-called secondary stirrer is at least 1000 rpm (can also be a rotor stator mixer pump). The volume of the reaction vessel is split into a primary volume for the main primary stirrer and a secondary volume for the rotor stator stirrer pump (secondary stirrer). The ratio of the primary and secondary volume is at least 20, preferably at least 40. The process is operated at a time longer than the recycle ratio of 3 between the two parts of the mixing vessel.

The process is preferably operated by loading the vessel with polymer ingredients to be dispersed. The vessel is then externally heated to the process temperature. The main (primary) stirrer is operated at the above indicated speed after the materials are sufficiently heated for at least 1 hr (typically approximately 10 hr). After sufficient mixing of the thermoplastic polymer ingredient an initial amount of water and optionally base (metal alkali or ammonia) is slowly added. The secondary stirrer volume is then connected to the main volume and carefully the secondary stirrer started. A time of at least 3 time the recycle ratio is used to mix the concentrated dispersion. This dispersion can then be diluted to the desired solids content. In order to control the viscosity of the dispersion the cooling can be controlled.

For EAA dispersions (but also for the other systems as indicated above, also for combined systems) it is preferred to use a hold temperature above the melting point of the polymer in order to get low viscosity dispersions. The cooling and final dilution can be done in a separate vessel.

Additional water and/or base can be added at this operating temperature (via the secondary rotor stator mixer pump). The operating temperature is maintained long enough to assure a recycle ratio at least 3 of the primary and secondary mixer. The material is cooled while under pressure to a temperature below the boiling point of water. Optionally the material can be held at a hold temperature before being cooled to ambient temperature.

The pressure in the process can be controlled/maintained independently via nitrogen padding.

SHORT DESCRIPTION OF THE FIGURES

In the accompanying drawings preferred embodiments of the invention are shown in which:

FIG. 1 is a schematic illustration of a unit for carrying out the method according to the invention.

DETAILED DESCRIPTION OF THE PREFERRED EMBODIMENTS

A process is described as a special stirred tank with at least 2 mixers in combination with an operational procedure to make dispersions. The inventive process has applicability in the area of so called "self dispersing" polymer dispersions as well as thermoplastic elastomer dispersions. The process allows the use of polymers with a higher viscosity and produces storage stable dispersions at high solids and low pH. The process can further be operated without the addition of solvents (addition of solvents is possible as well however resulting in dispersions with a level residual VOC)

The general operational procedure for ethylene acrylic acid (EAA) dispersions is well described in the Dow brochure "preparation of aqueous dispersions of PRIMACOR copolymers" and as concerns these general operational instructions this document is specifically included into the present specification. The amount of solids for a dispersion is shown as a function of the viscosity of the used polymer. A method for the calculation of the amount of base is given in this brochure.

Dispersions made with ammonia or other volatile amine bases is not recommended. without special cooling precautions.

Our inventive process shows a way to produce dispersion with alkaline systems based on metal hydroxide or with ammonia (volatile amine) dispersions by assuring that the ammonia has sufficient time to react with the ionic carboxylic groups of the polymer. Hence the evaporation loss of ammonia is limited (amino methyl propanol AMP can also act as amine base).

U.S. Pat. No. 6,852,792 finds that a special EAA is required in order to obtain a dispersion with a simple stirred tank operation. The limit of these dispersions is stated to be about 20% solids according to the examples of the specially high molecular weight material in that patent. The patent describes a method with a simple stirred tank using ammonia as the base. The patent does not mention the resulting pH of the dispersion. The used range of neutralization amount however when reproduced in our lab shows high pH (clearly above 8.5). The proposed inventive process shows a way to produce ammonia and/or KOH (alternatively NaOH or other metal hydroxide systems) based dispersions at higher solids and at low neutralization levels and thus pH below, preferably significantly below 9.

Elastomer dispersions are described in the state of the art based on styrenic block copolymers using a solvent dissolution, phase inversion, solvent stripping process (see introductory portion). The solvent is required in these procedures in order to lower the viscosity of the elastomer composition in the phase inversion process. The disadvantage of such a process is the use of a flammable solvent which requires special attention to the process safety. Also such a solvent is difficult to remove completely from the already formed aqueous dispersion. This typically results in coating materials with a specific amount of VOC resulting from the dispersion process. The inventive process eliminates these difficulties in that it is operates without the addition of a solvent by making the dispersion of the elastomer composition at a high viscosity.

Extruder based dispersion processes have been described by various companies in the past (see introductory portion). These processes have been used in order to allow the making of dispersion of highly viscous polymers or polymer compositions. The disadvantage of these processes is that they are continuous and hence have to be started and shut down which has the risk of waste material. The proposed inventive process converts all raw material into the desired dispersion (no waste). Also an extruder is a relatively expensive piece of equipment compared to the here described inventive process equipment including at least two stirrers in essentially one vessel. Also the residence time of material in an extruder is typically relatively small (normally less than 5 minutes). Hence such a tight of process according to the state-of-the-art does not typically allow slow reactions or establishment of equilibrium conditions. The proposed inventive process operates at a much longer time scale typically in excess of 2 hrs. The heating of thermoplastics in an extruder is typically mainly a result from the motor energy input. The heat influx in our inventive process is by external heating, which allows improved energy management in a production environment. Heat can be recovered in the cooling steps and reused for heating in a different batch.

The inventive process uses a large vessel equipped with a specific reinforced stirrer blade and a high torque motor. The blade has been reinforced to enable operation a high viscosity medium. The stirrer blade is essentially a combination of a wendel stirrer for high viscosity operation, combined with a low viscosity anker stirrer with stator for low viscosity operation. Another possibility is to combine these high and low viscosity stirrer operation in a co-axial alignment.

In addition the bearing of the stirrer and the motor of the stirrer are reinforced in order to handle the high forces of highly viscous materials (systems with a moment of more than 50'000 Nm on the shaft may sometimes be necessary). It can handle viscosities higher than 10000 mpas (between 1000 mpas up to in excess of 2000000 mpas). Typical hot melt viscosities can be handled at temperatures between 90 and 200° C.

This capability of the main vessel allows the melting and mixing of thermoplastic polymers and compositions typically only processible via extrusion.

The process is operated above the boiling temperature of water. The process is therefore operated at high pressure (typically in the range of 4-50 bar) to assure the water is liquid in the vessel up to 220° C.

The vessel can also be equipped with a "high pressure reflux condensor" to assure that water and possibly present volatile amine base is maintained in the composition over the entire prolonged process time.

This often requires that the bearings of the stirrers in the vessel a specially designed to assure that the vessel is operated leak free and without pressure loss. Specific examples of such a high pressure bearing are available by Burgman (DE).

The inventive process for the production of polymer dispersions is a batch stirred tank which is split into two sections: a primary section and a secondary section. The primary section has a volume at least 20 times bigger than the secondary section. The stirrers in both sections are able to handle high viscosities of bigger than 1000 mpas (1 pas, or even >1000 pas). The speed of primary stirrer is 1200 rpm or less and the speed of the secondary stirrer is at least 1200 rpm. The stirrer of the secondary vessel is a so called rotor stator pump. The process time in the vessel is chosen such that the so called recycle ratio of the secondary vessel into the primary vessel is excess of 3 via the rotor stator pump. The volume of the vessel split in a primary volume for the main stirrer and a secondary volume for the rotor stator stirrer pump.

The process is operated by loading the vessel with an initial amount of polymer composition and water and base (optional). The vessel is then externally heated (e.g. steam-heating) to the desired process temperature. The stirrers are operated at the above indicated speeds after the materials are sufficiently heated. Additional water and or base can be added at this operating temperature (via the secondary rotor stator mixer). The operating temperature is maintained in excess of the recycle ratio 5 of the primary and secondary mixer. The material is cooled while under pressure to a temperature below the boiling point of water. optionally the material can be held at a hold temperature before being cooled to ambient temperature. The pressure in the process can be maintained independently via nitrogen padding. The heating and cooling of the vessel are done via external sources and optionally via heat exchanger installed between the primary and secondary mixer volume. This heat exchanger is considered part of the secondary mixing volume.

The process can be used to produce solvent free dispersions which can be used in applications such as: barrier coatings, glass coatings, polymer fibres and polymer fibre coatings, heat seal coatings, primer coatings, construction, textile coatings, paper coatings, flexible packaging coatings, chip and fiber board coatings, glass, metal, paints and inks, ceramics.

FIG. 1 illustrates a unit which can be used for carrying out the method as described and which is in accordance with the unit according to the invention. The unit comprises a main reaction vessel 1 which represents the first volume. The reaction vessel is equipped with elements by means of which this first volume or more accurately the content thereof can be heated or cooled as desired. This can for example be a system of tubes located around or also within the reaction vessel 1. The reaction vessel 1 comprises a top opening which in this case is covered by cover 3 and through which the polymer, typically in granular form, can be input into the reaction vessel. The reaction vessel 1 is equipped with a first stirrer, the shaft 6 of which is visible. This shaft is driven by a strong drive motor 5. It is important to note that this stirrer has to be very powerful and correspondingly it has to be equipped with very sturdy bearings and the like.

On its bottom part the main reaction vessel 1 is equipped with a bottom valve 4 connecting it to the main exit pipe 10 of the reaction vessel 1.

Downstream of valve 4 there is provided a possibility for inputting cleaning means, normally given by demineralized water entering the system by means of the demineralized water pipe 7 or by pressurized air entering the system via the pressurized air pipe 8. These sources are provided for cleaning the piping system downstream of the reaction vessel e.g. once recirculation is stopped.

Downstream of the valve 4 within the pipe 10 there is provided a circulation pump 11 which is driven by motor 12, and even further downstream there is provided a first possibility of feeding reaction mixture out of the system by means of exit pipe 13 equipped with a valve indicated by, as in all the other cases, the capital letter V.

In line 10 there is also provided a pressure sensor as, as discussed further above, the whole system is pressurized to a pressure of well above one bar.

Further downstream there is on the one hand provided the possibility for inputting water, and if need be in combination with alkaline, into the system. To this end a pump 14 is provided the input of which is given by input pipe 15 which can be fed with preheated water and, depending on the operation step, preheated water in combination with alkali. Also here there is provided a pressure sensor 17 and depending on the process step either the provided preheated water is fed into the reaction vessel 1 (upper pathway 31) or immediately upstream (pathway 32) of the dispax chamber 20 into this mixing volume.

Indeed the mixing volume or the secondary stirrer is provided as a dispax chamber 20 of a secondary stirrer unit 18 which is driven by a motor 19.

This secondary stirrer unit is provided with a bypass line 21 equipped with a security valve 22.

Downstream of the secondary stirrer unit 18 the reaction mixture is channelled via pipe 23 (recirculation pipe), depending on the process step, either back via the recirculation branch 24 (controlled by valve 26) into the reaction vessel 1, or in the alternative via the exit branch 25, controlled by valve 27, to a second exit pipe. In this second exit pipe 30 there is provided a flow through cooling unit 29 which is able to very quickly and very efficiently cool down the reaction mixture, which is typically well above 150° C., to a temperature in the range of room temperature thus leading to a stable and very narrowly distributed dispersion in accordance with the present invention.

Generally in the context of this text it should be noted that the secondary volume is to be understood to be normally given not only by the volume of the actual secondary mixing chamber in case of recirculation piping system, so in this case by dispax chamber 20, but actually as the volume constituted by this chamber as well as of the piping leading to this chamber (pipe 10) as well as the piping leading from this chamber 20 (pipe 23 and 24) and back into vessel 1.

EXAMPLE 1

Conditions to Produce Dispersion of EAA XUS60758.02L (60% M.I., 17% AA, as Available from Dow) in Large Unit A vessel of 20 liter equipped with a main stirrer (Badema, DE) is connected with a dispax reactor (IKA, DE). The connecting volume of the dispax reactor to the main vessel is less than 2 liter. The vessel is filled with 3000 gram EAA material and heated externally to 140 C. The main stirrer is running during that time. After this procedure 3 l of water and 0.2 l of ammonia (17% solution) is added to the vessel. The amount of ammonia is calculated. The termperature is maintained while the main stirrer is held at 60 rpm for another hour to complete the addition of all water and ammonia. Then the bottom valve of the vessel is opened to allow the dispax reactor to be started. This stirrer is operated at 13000 rpm for 4 hrs at a pump volume of at least 80 kg/hr. The obtained concentrated dispersion is then cooled to about 90 C and held at this temperature for at least 1 hr, before it is cooled down to ambient temperature.

The result is a dispersion with 28% solids, pH 8, storage stability >3 month, average particle size 100 nm.

EXAMPLE 2

Conditions to Produce Dispersion of Two Mixed EAA's: 60 wt % Primacor 3440 (MI10, 9.7AA %, as Available from Dow Chemical Company) with 40wt % XUS60758.02L (60MI, 17% AA, as Available from Dow) in Large Unit A vessel of 20 liter equipped with a main stirrer is connected with a dispax reactor as an example 1. The connecting volume of the dispax reactor to the main vessel is less than 2 liter. The vessel is filled with 3000 gram of the above mixture and heated. The main stirrer is operating at 60 rpm for 10 hrs. After this procedure 3 l water and 0.2 l ammonia is added to the vessel (as an example 1). The temperature is maintained while the stirrer is held at 60 rpm for another hour to complete the addition of all water and ammonia. Then the bottom valve of the vessel is opened to allow the dispax reactor to be started. This stirrer is operated at 13000 rpm for 5 hr. The obtained concentrated dispersion is then cooled to about 90 C and held at this temperature for at least 1 hr, before it is cooled down to ambient temperature.

The result is a dispersion with solids 35%, pH 8, storage stability >3 month, average particle size 300-400 nm.

EXAMPLE 3

Conditions to Produce Dispersion of SIS with EAA's : 67% wt % Kraton D 1161 (as Available from Kraton) with 33 wt % Primacor 5980 (300 MI, 2'0.5% AA, as Available from Dow) in Large Unit A vessel of 20 liter equipped with a main stirrer is connected with a dispax reactor as an example 1. The connecting volume of the dispax reactor to the main vessel is less than 2 liter. The vessel is filled with 3000 gram combined material and heated. The main stirrer is operating at 60 rpm for 10 hrs. After this procedure 3 l water and 0.2 l ammonia is added to the vessel (as an example 1). The temperature is mainted while the stirrer is held at 60 rpm for another hour to complete the addition of all water and ammonia. Then the bottom valve of the vessel is opened to allow the dispax reactor to be started.

This stirrer is operated at 13000 rpm for 5 hr. The obtained concentrated dispersion is then cooled to about 90 C and held at this temperature for at least 1 hr, before it is cooled down to ambient temperature.

The result is a dispersion with solids 40%, pH 8, storage stability >3 month, average particle size below 20 μm.

EXAMPLE 4

Conditions to Produce Dispersion of Polyester with EAA's : 19% wt % of a Commercially Available Polyester with 15 wt % Primacor in Large Unit can be Chosen to be Essentially Equivalent to Above Example 3.

The result is a dispersion with solids 30%, pH8, storage stability >3 month, average particle size below 10 μm.

LIST OF REFERENCE NUMERALS

1 main reaction vessel
2 cooling/heating means for 1
3 cover on opening for loading of 1
4 bottom valve of 1
5 drive motor of stirrer in 1
6 shaft of stirrer in 1
7 demineralized water pipe
8 pressurized air pipe
9 pipe for cleaning media
10 main exit pipe of 1
11 circulation pump
12 motor of 11
13 exit pipe with valve
14 pump
15 input pipe for preheated water/alkali
16 pressure sensor
17 pressure sensor
18 secondary stirrer unit
19 motor of 18
20 dispax chamber
21 bypass line of 18
22 security valve of 21
23 recirculation pipe
24 recirculation branch
25 exit branch
26 valve in 24

27 valve in 25
28 outlet of 23 in 1
29 flow-through cooling unit
30 second exit pipe
31 reagent input pipe into 1
32 reagent input pipe into 10

The invention claimed is:

1. A method for the production of thermoplastic or elastomeric polymer dispersions, using a reaction vessel with a first volume and a secondary volume, wherein a first stirrer is located and operative in said first volume and a secondary stirrer is located and operative in said secondary volume, wherein the first volume is at least 20 times larger than the secondary volume, wherein the stirrers in both volumes are able to handle viscosities above of or equal to 1000 mpas, including the steps of
   a. loading the first volume of the vessel with an initial amount of polymer and optionally water and/or optionally alkaline;
   b. heating the vessel externally to a target process temperature in the range of 80-300° C.;
   c. operating the first stirrer in the first volume for at least half an hour at a speed of in the range of 10-100 rpm, wherein step c. is optionally carried out concomitant to step b;
   d. addition of water and optionally alkaline to the first volume;
   e. connection of the secondary volume to the first volume and operating the secondary stirrer in the secondary volume at a speed of above 1000 rpm and recycling the reaction product through said secondary stirrer while keeping the operating temperature essentially constant during a timespan in excess of the recycle ratio of 3 of the primary and the secondary mixer to form the dispersion.

2. The method according to claim 1, wherein within step a. the first volume is only loaded with polymer or polymer precursor material essentially free of water;
   within step b., carried out concomitant to or overlapping with step c., the first volume and the polymer therein is actively heated to a process temperature above or equal to 155° C. leading to polymer material in liquid state;
   wherein step d. comprises the following steps
   d1. essentially continuous or finely divided batch wise addition of a first amount of water, in combination with alkaline in an amount leading to a solids content of in the range of 80-95% for a time span in the range of 15-60 minutes while keeping the temperature in the first volume at at least 140° C.;
   optionally subsequent stirring of the corresponding reaction mixture for another 10-30 minutes;
   d2. continuous or batch wise addition of non-alkaline water, during 60-120 minutes, leading to a solids content in the range of 50-70%.

3. The method according to claim 1, wherein after the above-mentioned steps a.-e. a further amount of water, is added to the first volume and/or to the secondary volume such as to establish a solids content in the range of 30-50%, subsequently the reaction mixture is optionally stirred for another 5-30 minutes, and subsequently a recirculation line is diverted to an output line, in which the reaction mixture is rapidly cooled to a temperature of 20-40° C., in a shock cooling step.

4. The method according to claim 1, wherein the target process temperature is in the range of 100-200° C. or wherein the secondary stirrer is a rotor stator pump or wherein the tip speed of the primary stirrer is below 50 km/h.

5. The method according to claim 1, wherein the first volume is located in a bottom part of the reaction vessel and the secondary volume is located in a top part of the reaction vessel, and wherein when loading the reaction vessel initially only the bottom part forming the first volume is filled with reactants.

6. The method according to claim 1, wherein the secondary stirrer is a rotor stator pump the input side of which is connected to the bottom of the first volume via a controllable valve, and the output side of which is connected to the top part of the first volume, and wherein after step d. said valve is opened to initiate assisted recirculation during step e.

7. The method according to claim 1, wherein step c. is carried out for at least one hour.

8. The method according to claim 1, wherein step e. is carried out for at least 5 minutes.

9. The method according to claim 1, wherein during steps c.-e. the pressure in the reaction vessel is maintained in the range of 4 -20 bar.

10. The method according to claim 1, wherein the dispersion formed in step e. has an average particle size below 20 μm.

11. The method according to claim 1, wherein the dispersion formed in step e. has a pH value below 9.

12. The method according to claim 1, wherein the polymer filled into the vessel in step a. is selected from the first group consisting of: EAA (ethylene acrylic acid), EMAA (ethylene/methacrylic acid), olein, stearin, rosins, or mixtures thereof, optionally in a mixture with a system selected from the second group consisting of: SIS (styrene-isoprene-styrene), SBS (styrene butadiene styrene), SEBS (styrene ethylene butadiene styrene), SES (styrene ethylene styrene), EVA (ethylene vinyl acetate), PP (polypropylene), PE (polyethylene), polyester, PET (polyethylene terephthalate), PVC (polyvinyl chloride) or a mixture of these systems, wherein in a mixed system the thermoplastic/elastomeric polymer part of the first group is present as at least 20 volume percent.

13. A reaction vessel for carrying out a method according to claim 1, wherein it comprises a first volume with external heating located in a bottom part of the reaction vessel and a secondary volume located in a top part of the reaction vessel or wherein the secondary volume is given by a recirculation piping system with stifling means recirculating reaction fluid of the first volume, wherein the first volume is at least 20 times larger than the secondary volume, wherein the stirrers in both volumes are able to handle viscosities above of or equal to 1000 mpas, wherein a first stirrer is located in the first volume and a secondary stirrer is located in the secondary volume and wherein the first and the secondary stirrers are mounted coaxially in the reaction vessel and can be operated at different speeds or wherein the secondary stirrer is a dispax chamber (20).

14. The method according to claim 1, wherein within step a. the first volume is only loaded with polymer or polymer precursor material essentially free of water, in granular form;
   within step b., carried out concomitant to or overlapping with step c., the first volume and the polymer in granular form therein is actively heated to a process temperature in the range of 155-180° C. leading to polymer material in liquid state;
   wherein step d. comprises the following steps
   d1. essentially continuous or finely divided batch wise addition of a first amount of water, in combination with alkaline preheated to a temperature of at least 120° C., as a metal hydroxide solution in an amount leading to a solids content of in the range of 80-95% for a time span in the range of 15-60 minutes, while keeping the temperature in the first volume at at least 140° C.;

optionally subsequent stirring of the corresponding reaction mixture for another 10-30 minutes while keeping the temperature essentially constant, and above 140° C.;

d2. continuous or batch wise addition of non-alkaline water, preheated to a temperature of 120° C., during 60-120 minutes, while keeping the temperature controlled to be essentially constant and at a level of at least 140° C., leading to a solids content in the range of 50-70%.

15. The method according to claim 1, wherein after the above-mentioned steps a.-e. a further amount of water, preheated to a temperature of at least 120° C., is added to the first volume and/or to the secondary volume such as to establish a solids content in the range of 30-50%, subsequently the reaction mixture is optionally stirred for another 5-30 minutes, and subsequently a recirculation line is diverted to an output line, in which the reaction mixture is rapidly cooled to a temperature of 20-40° C., in a shock cooling step.

16. The method according to claim 1, wherein the first volume is located in a bottom part of the reaction vessel and the secondary volume is located in a top part of the reaction vessel, and wherein when loading the reaction vessel initially only the bottom part forming the first volume is filled with reactants, wherein the first and secondary stirrers are mounted in the reaction vessel coaxially.

17. The method according to claim 1, wherein step c. is carried out during 1-5 hours.

18. The method according to claim 1, wherein step e. is carried out for at least an hour.

19. The method according to claim 1, wherein during steps c.-e. the pressure in the reaction vessel, in the first volume, is maintained in the range of 4-20 bar.

20. The method according to claim 1, wherein the dispersion formed in step e. has an average particle size below 10 µm.

21. The method according to claim 1, wherein the dispersion formed in step e. has an average particle size below or equal to 10 µm.

22. The method according to claim 1, wherein the dispersion formed in step e. has a pH value in the range of 7-8.3.

23. The method according to claim 1, wherein the polymer filled into the vessel in step a. is selected from the first group consisting of: EAA (ethylene acrylic acid), EMAA (ethylene/methacrylic acid), olein, stearin, colophony, or mixtures thereof, optionally in a mixture with a system selected from the second group consisting of: SIS (styrene-isoprene-styrene), SBS (styrene butadiene styrene), SEBS (styrene ethylene butadiene styrene), SES (styrene ethylene styrene), EVA (ethylene vinyl acetate), PP (polypropylene), PE (polyethylene), polyester, PET (polyethylene terephthalate), PVC (polyvinyl chloride) or a mixture of these systems, wherein in a mixed system the thermoplastic/elastomeric polymer part of the first group is present as at least 20 volume percent, in the range of 30-40 volume percent.

* * * * *